United States Patent [19]

Sell

[11] 4,412,168
[45] Oct. 25, 1983

[54] BATTERY CHARGING AND INDICATING CIRCUIT

[75] Inventor: Michael R. Sell, Denton, Md.

[73] Assignee: Black & Decker, Inc., Newark, Del.

[21] Appl. No.: 282,058

[22] Filed: Jul. 10, 1981

[51] Int. Cl.³ .............................................. H02J 7/02
[52] U.S. Cl. ........................................ 320/48; 320/59; 340/636; 362/183
[58] Field of Search ............................ 320/48, 57, 59; 340/636; 362/183, 208

[56] References Cited

U.S. PATENT DOCUMENTS

| | | | |
|---|---|---|---|
| 3,316,417 | 4/1967 | Tolmie | 320/2 X |
| 3,453,518 | 7/1969 | Rose et al. | 320/5 |
| 3,890,555 | 6/1975 | Nelson et al. | 320/2 |
| 3,900,783 | 8/1975 | Herzog et al. | 320/48 X |
| 4,145,648 | 3/1979 | Zender | 320/48 X |
| 4,160,941 | 7/1979 | Bennett | 320/59 X |
| 4,177,413 | 12/1979 | Ascoli | 320/48 X |

*Primary Examiner*—William M. Shoop
*Attorney, Agent, or Firm*—Finnegan, Henderson, Farabow, Garrett & Dunner

[57] ABSTRACT

A circuit provides a half-wave rectified current for charging batteries from an AC source. The circuit comprises a rectifier, such as a diode, in series with the batteries and biased to conduct a first half cycle charging current from the AC source and a signal emitting and rectifying device, such as a light emitting diode (LED), biased oppositely from said rectifier, to conduct the opposite half cycle of current and adapted to emit a signal when conducting to indicate the charging process.

3 Claims, 2 Drawing Figures

BATTERY CHARGING AND INDICATING CIRCUIT

FIELD OF THE INVENTION

The present invention pertains to circuits for charging batteries. More particularly, the present invention pertains to circuits for charging batteries having means for indicating the charging process.

BACKGROUND OF THE INVENTION

A variety of battery operated devices, such as flashlights, use rechargeable batteries and provide charging circuitry which permits the batteries to be recharged without removing them from the device.

The charging circuit provides a relatively low DC current for charging the batteries from a standard AC line power source. The standard, 110–120V AC line voltage may be reduced to appropriate levels by capacitance and resistance components or by a step-down transformer. The subject circuit is particularly intended for use with step down transformers which, typically, provide significantly greater voltage drops than most capacitance-resistance devices. The AC source current is rectified to DC by a half-wave or full-wave rectifier. Half-wave rectifiers use components, generally diodes, which conduct only one half cycle of AC current to produce a "clipped", pulsating DC current output which comprises only one half cycle of the AC source. In a full-wave rectifier, a combination of oppositely biased rectifiers, generally diodes, cooperate to provide an unidirectional output which comprises both cycles of the AC current source, one half cycle having been, in effect, "inverted" to produce a direct current signal.

Charging circuits may also include indicators which signal when charging is in progress. Conventional lamps, neon tubes and light emitting diodes (LEDs) have been used as indicators. LEDs are particularly suited to this application as they consume less power than conventional lamps and as they may be readily incorporated into a charging circuit. For example, U.S. Pat. No. 4,177,413 (Ascoli, 1979) teaches a battery circuit comprising a full-wave bridge rectifier. One of the diodes in the four-diodes bridge comprises an LED. Thus, charging indication is achieved without increasing the number of components used.

If the LED is placed in series with the battery, the LED receives the full charging current. As LED's typically have a relatively small current capacity, the available charging current must be limited to the maximum LED current capacity. Accordingly, the addition of an LED in series with the battery limits the efficiency of the circuit and increases the required charging time. Moreover, as the LED provides series resistance, it increases the voltage required by the circuit to provide an adequate charging voltage across the batteries.

Even where the LED is placed in parallel with the battery and resistors are provided in series with the LED to reduce its share of the current, the LED is not independent of the battery. The parallel LED still diverts a portion of the available charging current and, so, increases the total voltage required to provide a predetermined charging current to the battery. Increased voltage requirements generally necessitate the use of larger and more expensive transformers and, so, render the circuit less economical.

Accordingly, significant advantages and economies would be achieved by providing a battery charging and indicating circuit in which charging current is not diverted from the battery to the indicating device. Further advantages and economies would be realized by providing means for deploying an indicating device in a battery charging circuit without increasing the voltage requirements of the circuit.

SUMMARY OF THE INVENTION

A battery charging and indicating circuit comprises a charging circuit loop including batteries and a half-wave rectifier for providing a pulsating DC charging current from an AC line power source and an indicating circuit loop for signalling when charging is in progress. A step-down transformer provides an alternating current of suitable voltage from the typical line voltage power supply. The charging circuit loop comprises a rectifier, typically a standard diode, which conducts in only one direction and so will conduct only one half cycle of AC current. The indicating circuit loop comprises a signalling and rectifying device, such as a light emitting diode (LED), which lights to indicate the charging process. More particularly, and according to the present invention, the LED is biased oppositely from the standard diode, parallel with the batteries, and is fired by the half cycle of alternating source current not used for charging the batteries. Accordingly, the LED is completely independent of the batteries and does not impose any additional voltage requirements of the circuit. Moreover, the current in the indicating loop may be controlled with resistors without affecting the current in the battery charging loop.

It is, therefore, an object of the present invention to provide a battery charging circuit having indicator means which operate independently of the battery. It is a further object of the present invention to provide a battery charging circuit with indicator means without imposing additional voltage requirements of the circuits. Other objects and advantages of the present invention will be apparent when the following detailed description is read in conjunction with the drawings in which:

DESCRIPTION OF THE PREFERRED EMBODIMENT

Figure 1:
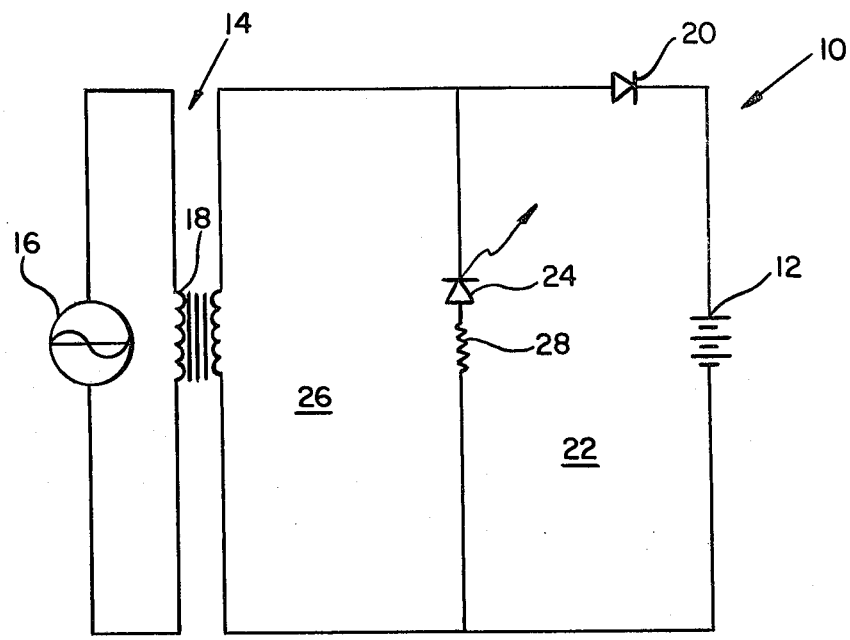
FIG. 1 is a schematic diagram of the battery charging and indicating circuit thereof.

The battery charging and indicating circuit hereof is shown schematically in FIG. 1 and indicated generally at 10. The circuit 10 provides a relatively low DC voltage charging current to the batteries 12 from an AC source indicated generally at 14. The AC source comprises a standard line voltage power supply 16 and a step-down transformer 18 which effects a voltage drop to provide an AC source voltage of suitable voltage across the circuit 10.

The AC source current is rectified to a pulsating DC charging current by a half-wave rectifier. The rectifier comprises a standard diode 20. A diode is adapted to conduct current in only one direction, and so will conduct during only one half cycle of AC current. Thus, the diode 20 is biased according to the polarity of the batteries 12 to conduct only that half cycle of current having the proper direction for charging.

It will be appreciated that step-down transformer 18, diode 20 and batteries 12 comprise a complete charging circuit loop 22 which provides a clipped, pulsating DC current, one half cycle of the AC source current, to the batteries from the AC source.

A signalling and rectifying means, such as light emitting diode 24 (LED), is provided to indicate when charging is taking place. The LED is biased oppositely from the standard diode 20 to conduct only during the half cycle not conducted by the standard diode. Accordingly, the LED comprises part of a second, indicating circuit loop 26 which conducts the portion of the AC current source not conducted by the charging loop 22. As the charging loop 22 and the indicating loop 26 conduct during different half cycles, the loops are substantially independent and the current in either loop may be varied without affecting the current in the other. It should be noted that the indicating loop would perform similarly if it comprised separate rectifying and signalling components, the rectifying component being biased oppositely to the diode 20. However, the LED of the preferred embodiment provides simplicity and relative economy over such combinations.

As is well known, the maximum currents to which LEDs can be subjected are substantially smaller than optimal battery charging currents. Therefore, where the LED and batteries are in series, the charging current is limited to the maximum current capacity of the LED. Placing the LED and batteries in parallel permits the portion of current conducted by the LED to be controlled with series resistors; however, the resistors and LED divert a portion of the total available current and, so, add to the voltage requirements of the circuit. As the charging current to the batteries is a function of the respective resistances of the two loops, the LED and resistors directly affect the current available for battery charging.

Advantageously, in the subject circuit, the series combination of LED and resistor and the batteries are in distinct loops. Each loop conducts during different current half cycles; therefore changes in the resistance in a particular loop affect only its cycle of source current. There is no effect on the other cycle of source current in the other loop, and the voltage drops across the loops remain equal. As the addition of the LED and resistors herein does not divert current from the batteries, the total available voltage need not be increased over that required to charge the batteries and the charging loop does not increase the voltage requirements of the circuit.

In the preferred embodiment, the AC source comprises the standard line voltage power supply 16, generally 110-120 V, and a step-down transformer 18 which provides a suitable output AC source voltage of approximately 5.5 V. One half cycle of the 5.5 V AC source is applied across the charging loop 22 and the other half cycle, across the indicating loop 26. In the charging loop, there is a voltage drop of approximately 0.7 V across the diode 20 and a drop of substantially the remaining 4.8 V across the batteries 12. The resistance provided by the three batteries 12 of the preferred embodiment and the diode result in a charging current of about 125-150 milliamps (ma) in the charging loop 22. In the indicating loop, the optimum firing current for the LED 24 is about 20 ma; the voltage drop across the LED is about 1.8 V. Accordingly, a resistor 28 of approximately 220 ohms is provided in series with the LED 24, to limit the current through the LED to its proper firing current of approximately 20 ma.

Figure 2:
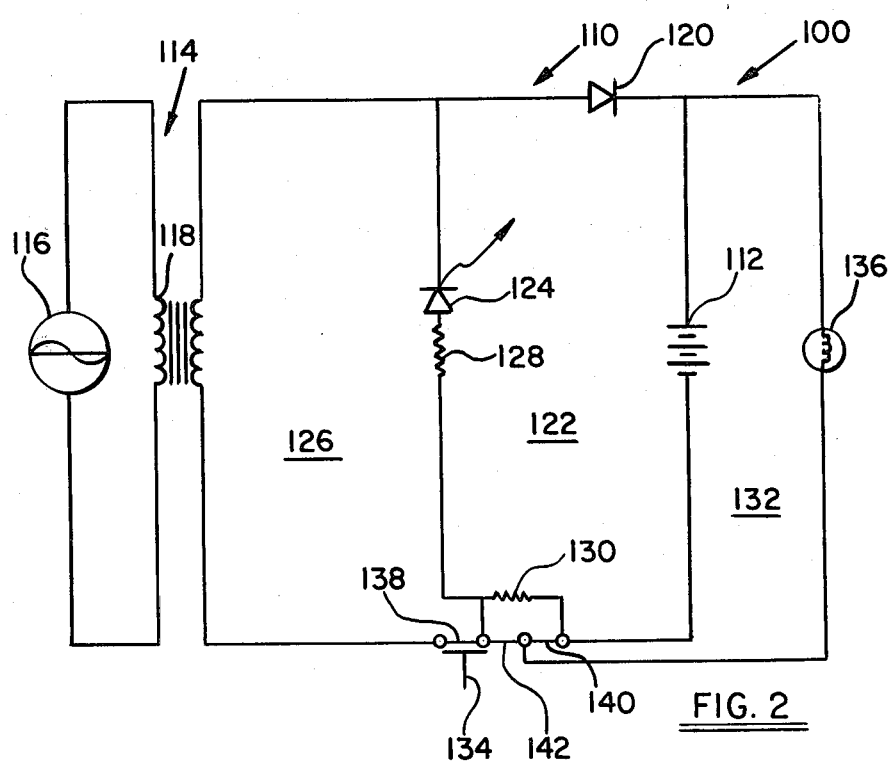
FIG. 2 is a schematic diagram of the battery charging and indicating circuit thereof incorporated into a flashlight circuit.

With reference to FIG. 2, there is depicted a flashlight circuit 100 which incorporates the battery charging and indicating circuit 110 hereof. As in the charging circuit of FIG. 1, an AC power source indicated generally at 114 comprises a standard, line 110-120 V AC power supply 116 and a step-down transformer 118 which effects a voltage drop to provide an AC source of a suitable voltage, 5.5 V in the preferred embodiment, across the circuit 110.

The battery charging and indicating circuit 110 comprises a charging loop 112 and an indicating loop 126. The indicating loop 126 is identical to loop 26 in FIG. 1, as described, comprising an LED 124 and a current limiting resistor 128. The charging loop 122 is similar to loop 22, having a standard, rectifying diode 120 and three batteries 112, and further includes a resistor 130, the purpose of which will be explained hereinbelow. The resistor 130 is only approximately 1 ohm and, therefore, does not alter significantly the performance of charging loop 122 from that of loop 22 of FIG. 1, as described above.

The flashing circuit 100 further comprises a lighting loop 132 and a three position slide switch 134. The lighting loop 132 generally extends between a lamp 136 and the batteries 112. In a first position 138, the switch closes the charging and indicating circuit 110 to charge the batteries 112 and cause the indicator LED to light in the above-described manner. In a second position 140, the switch closes the lighting loop circuit between the lamp 136 and the batteries 112 causing the lamp to light. In a third position 142, the switch 134 extends the lighting loop circuit to include the 1 ohm resistor 130 in the charging loop 122, thereby increasing slightly the resistance in the lighting loop 132. The current in the lighting loop is thereby diminished, decreasing the power output of the lamp and causing it to light somewhat less brightly than when the lamp and batteries are directly connected. Accordingly, the second position 140 corresponds to a relatively high beam, the third position 142, to a relatively low beam.

Thus, the present invention provides a simple, power efficient battery charging and indicating circuit having charging and indicating loops which conduct during different cycles of AC source current to provide independently variable currents in the respective loops. Further, the charging and indicating circuit has been incorporated into a flashlight circuit having relatively high and low beam lighting modes.

Clearly, the subject battery charging and indicating circuit is susceptible to a variety of modifications and adaptations readily apparent to the skilled artesan; for example, implementation into diverse types of battery operated devices, or substitution of sound, rather than light, emitting and indicating means in the indicating loop, all such modifications and adaptations falling within the scope and spirit of the appended claims.

What is claimed is:

1. A circuit for selectively charging a flashlight battery, indicating the charging process, and operating a flashlight from said battery, said circuit comprising:

a battery charging and indicating circuit portion for providing DC charging current from an AC line current source having alternating half cycle voltage and current, said circuit portion comprising a step down transformer having a primary and a secondary, the primary being electrically connected to said AC line current source whereby the transformer is adapted to reduce the voltage of said AC line current source, a charging loop, electrically connected to the secondary of said transformer and comprising a battery and a rectifier, adapted to conduct only those alternate half cycles of said reduced voltage AC line current source comprising charging current for said battery, and a separate indicating loop, electrically connected to the secondary of said transformer, comprising first discrete current limiting means and combined rectifying and signalling means, said combined rectifying and signalling means being biased to conduct only those half cycles of reduced voltage AC line current source not conducted by said battery charging loop rectifier and emitting a signal when it conducts;

a flashlight operating circuit portion comprising a lamp positioned in series with said battery; and switch means for selectively closing said battery charging and indicating circuit portion and said flashlight operating circuit portion.

2. A circuit for selectively charging a flashlight battery, indicating the charging process, and operating a flashlight from said battery, said circuit comprising:

a battery charging and indicating circuit portion for providing DC charging current from an AC power source having alternating half cycle current, said circuit portion comprising a step down transformer having a primary and a secondary, the primary being electrically connected to said AC source whereby the transformer is adapted to reduce the voltage of said AC source, a battery charging loop electrically connected to the secondary of said transformer and comprising a battery and a rectifier, adapted to conduct only those alternate half cycles of said reduced voltage AC source comprising charging current for said battery, and a separate indicating loop, electrically connected to the secondary of said transformer and comprising first discrete current limiting means and combined rectifying and signalling means, said combined rectifying and signalling means being biased to conduct only those half cycles of reduced voltage AC source current not conducted by said battery charging loop rectifier and emitting a signal when it conducts;

a flashlight operating circuit portion comprising a lamp positioned in series with said battery;

second current limiting means for limiting current in said flashlight operating circuit portion; and switch means for selectively closing said battery charging and indicating circuit portion and said flashlight operating circuit portion, and for switching said second current limiting means into said flashlight operating circuit portion.

3. The circuit of claim 1 or 2 wherein said combined rectifying and signalling means comprises a light emitting diode.

* * * * *